US006630983B2

(12) United States Patent
Marcari et al.

(10) Patent No.: US 6,630,983 B2
(45) Date of Patent: Oct. 7, 2003

(54) APPARATUSES FOR DEVELOPING FILMS, PARTICULARLY MOVIE FILMS

(75) Inventors: Giancarlo Marcari, Rome (IT); Osvaldo Valelli, Rome (IT)

(73) Assignees: Technicolor S.p.A., Rome (IT); O.M.S. 88 Srl, Rome (IT)

( * ) Notice: Subject to any disclaimer, the term of this patent is extended or adjusted under 35 U.S.C. 154(b) by 0 days.

(21) Appl. No.: 09/934,877

(22) Filed: Aug. 22, 2001

(65) Prior Publication Data

US 2002/0094205 A1 Jul. 18, 2002

(30) Foreign Application Priority Data

Sep. 8, 2000 (IT) .................................... RM2000A0485

(51) Int. Cl.[7] .......................... G03B 11/00; G03D 3/08; G03D 13/08

(52) U.S. Cl. .......................... 352/56; 396/615; 396/649

(58) Field of Search ............................ 352/56; 396/612, 396/615, 618, 646, 647, 649; 242/364.3

(56) References Cited

U.S. PATENT DOCUMENTS

| | | | | | |
|---|---|---|---|---|---|
| 2,210,880 | A | | 8/1940 | Capstaff | |
| 2,584,293 | A | * | 2/1952 | Sachs et al. | 226/37 |
| 2,865,630 | A | * | 12/1958 | Enkelmann | 242/364.3 |
| 3,370,801 | A | * | 2/1968 | Ames | 242/364.3 |
| 3,575,100 | A | | 4/1971 | Krause | |
| 4,067,034 | A | * | 1/1978 | Kwiatkowski | 396/589 |
| 5,402,868 | A | * | 4/1995 | Handke et al. | 188/322.12 |
| 6,186,438 | B1 | * | 2/2001 | Zeppenfeld et al. | 242/547 |

FOREIGN PATENT DOCUMENTS

| | | |
|---|---|---|
| FR | 962193 | 6/1950 |
| GB | 343137 | 2/1931 |
| GB | 577355 | 5/1946 |

* cited by examiner

*Primary Examiner*—Russell Adams
*Assistant Examiner*—D. Ben Esplin
(74) *Attorney, Agent, or Firm*—Samuels, Gauthier & Stevens

(57) ABSTRACT

The invention concerns an apparatus for developing films, particularly movie films, comprising a plurality of substantially vertical frames (1), for supporting and winding the film (3), placed within the different treatment rooms, each one of said frames (1) providing a plurality of transmission turns for the film, each one of said turns substantially comprising an upper pulley (2) and a lower pulley (4), and tensioning means of the film acting on the lower pulley (4), said apparatus being characterized in that said tensioning means of the film (3) in the single turns are comprised of piston means (11), provided under the lower pulley (4) of said turn, a single feeding system being provided for the piston means (11) of each frame (1).

7 Claims, 4 Drawing Sheets

APPARATUSES FOR DEVELOPING FILMS, PARTICULARLY MOVIE FILMS

BACKGROUND OF THE INVENTION

1) Field of the Invention

The present invention relates to an improvement in the apparatuses for developing films, particularly movie films.

More specifically, the invention relates to a new solution for an element of apparatuses of the above kind allowing to obtain a better development quality, beside a higher efficiency of the development of the same films.

2) Description of the Prior Art

At present, movie films are developed within very big apparatuses providing a dark room, a series of treatment rooms, within which the film is subjected to various treatments, such as fixing, washing, drying, etc.

The film, the length of which varies and in any case is noticeable, is wound about vertical frames, placed side by side each other within the various rooms., each one of said frames providing a series of vertical turns of the film, said film advancing mechanically dragged, up to the exit of the apparatus and to the winding about the final spool.

After the initial charging, the film advances along the apparatus, passing from one frame to the other one, without any interruption, through the various turns, passing from a treatment room to the following one. The number of turns per each frame and the number of frames for each room can be different according to the specific needing.

In order to properly advance, maintaining the correct orientation, turns of the film must be put under tension at the bottom in order to allow a proper advancement of the same film.

In the apparatuses of this kind presently used, tensioning of the film is obtained providing at the bottom of each turn a suitably sized weight. Being the number of turns provided in each apparatus very large, it can be easily understood both the complexity of this kind of solution, and the weight that every apparatus provides just for the presence of these weights.

Beside this particular, it must be considered that the optimum tension of the film varies in function of each single development speed, since the higher is the speed and higher must be the tension to which the film must be subjected.

Obviously, in an apparatus providing the tensioning by a weight for each single turn, once chosen the weight to be used, it is neither thinkable nor realisable to change the weight in case it is wished to vary the production speed.

Moreover, just for the same reasons, the weight will be suitable for the speed operation of the apparatus, but it will be not suitable for example at the start or in case of operation at a speed reduced with respect to the programmed speed, with consequent potential buckling of the film, which is subjected to an undue load.

All the above has heavy consequences on the productivity of the apparatus, mainly with reference to the quality of the product, to the flexibility and to the production rate.

BRIEF SUMMARY OF THE INVENTION

In view of the above, the Applicant has realised an improvement in the apparatuses for developing films, particularly movie films.

Main object of the present invention is that of realising an improved apparatus for developing movie films providing a turns tensioning system for the various frame which is extremely simple under a constructive point of view.

Another object of the present invention is that of providing a solution of the above kind which allow to freely modify the tension of the turns of each single frame, in such a way to adapt the speed to the wished production speed, to the specific step to which it is subjected, thus optimising the apparatus operation.

Still another object of the present invention is that of providing an improved apparatus of the above kind that allows to avoid to subject the film to undue stresses.

These and other results are obtained according to the present invention proposing an apparatus for developing films, particularly movie films, wherein the tensioning of the single turns of each frame is obtained by a pneumatic piston, or equivalent means, the loading of which can be adjusted, for each frame, in function of the specific needing.

It is therefore specific object of the present invention an improved apparatus for developing films, particularly movie films, comprising a plurality of substantially vertical frames, for supporting and winding the film, placed within the different treatment rooms, each one of said frames providing a plurality of transmission turns for the film, each one of said turns substantially comprising an upper pulley and a lower pulley, and tensioning means of the film acting on the lower pulley, said apparatus being characterised in that said tensioning means of the film in the single turns are comprised of piston means, provided under the lower pulley of said turn, a single feeding system being provided for the piston means of each frame.

According to the invention, it can be provided one of said piston means for each turn of the frame.

Still according to the invention, it can be provided a piston for a group of turns, said group of turns could be comprised of two or more turns.

Furthermore, according to the invention, said piston can be a pneumatic, hydraulic, oleodynamic, oleopneumatic, etc. piston, preferably a pneumatic piston.

In a particularly preferred embodiment of the apparatus according to the invention, said tensioning means of the film comprise a block, within which a chamber for the primary air and a chamber for the secondary air are realised, a frame, supporting each lower pulley of the turns, vertically slidable with respect to said block, and pneumatic piston means, preferably, but not exclusively, one piston means for each turn, placed between the lower part of said frame and said block, in such a way to act as traction on the lower pulley of the turn.

Still according to the invention, valves are provided on said air primary and secondary chambers.

Furthermore, according to the invention, a protection bellow can be provided on said piston means.

Always according to the invention, said lower pulley is oriented with an angle with respect to the upper pulley.

BRIEF DESCRIPTION OF THE DRAWINGS

The present invention will be now described, for illustrative but not limitative purposes, according to its preferred embodiments, with particular reference to the figures of the enclosed drawings, wherein.

DETAILED DESCRIPTION OF THE PRIOR ART

In the enclosed figures, it is particularly shown a frame 1 of an apparatus for developing films, since the improvement introduced according to the present invention can be described limiting to this particular, not being relevant in which treatment room the frame is provided, and the development apparatus can be of any kind.

Figure 1:
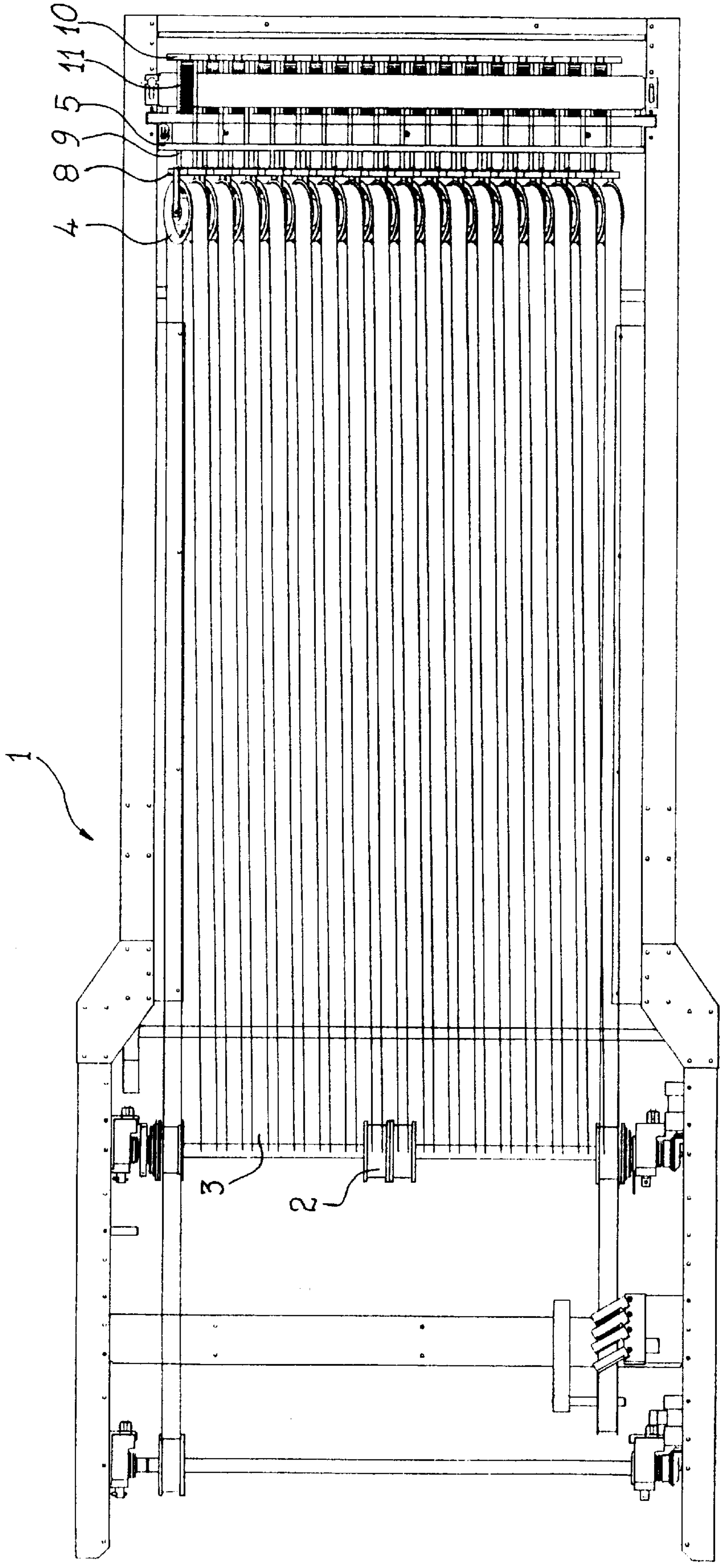
FIG. 1 shows a frame of an apparatus embodying the solution according to the invention.
Figure 2:
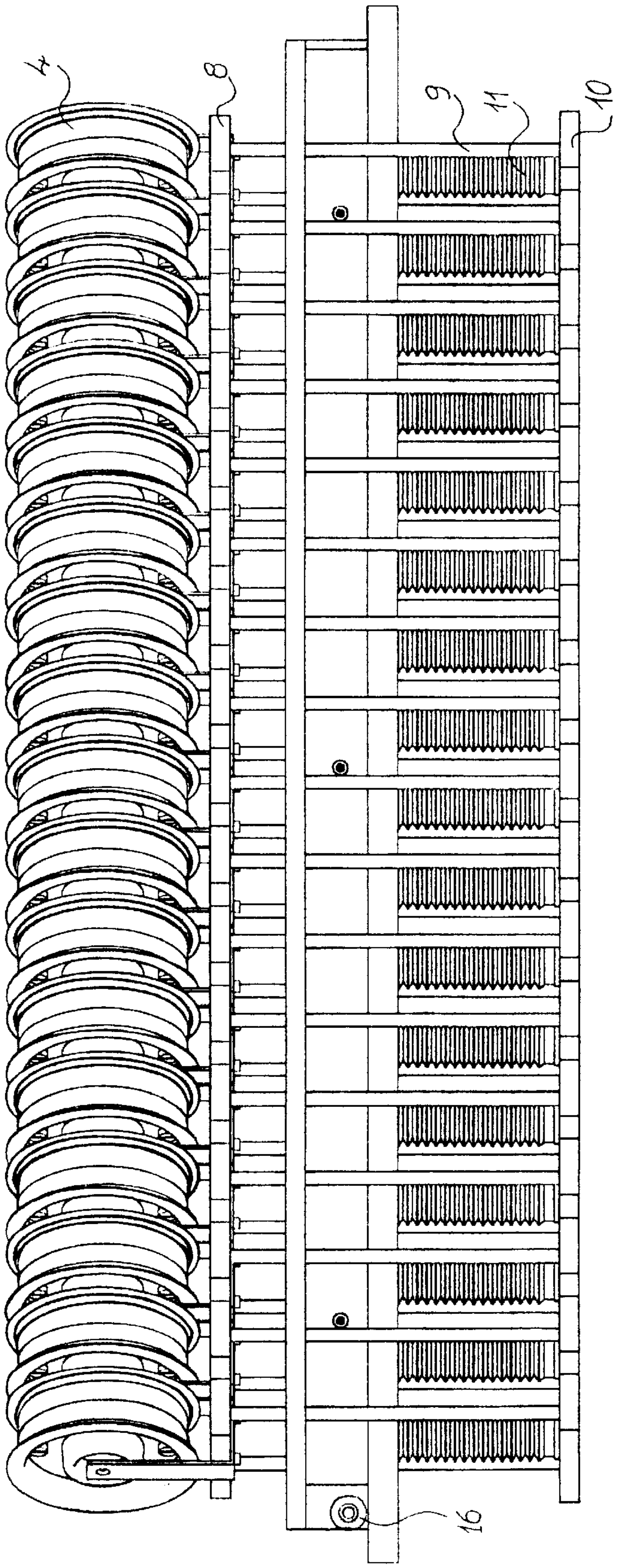
FIG. 2 is a front view of a particular of the frame of FIG. 1 without film.
Figure 3:
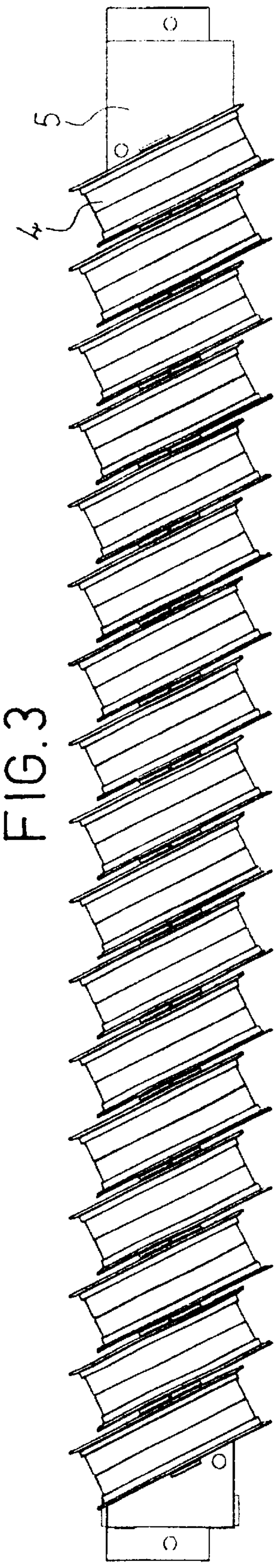
FIG. 3 is a view from the above of the particular of FIG. 2.
Figure 4:
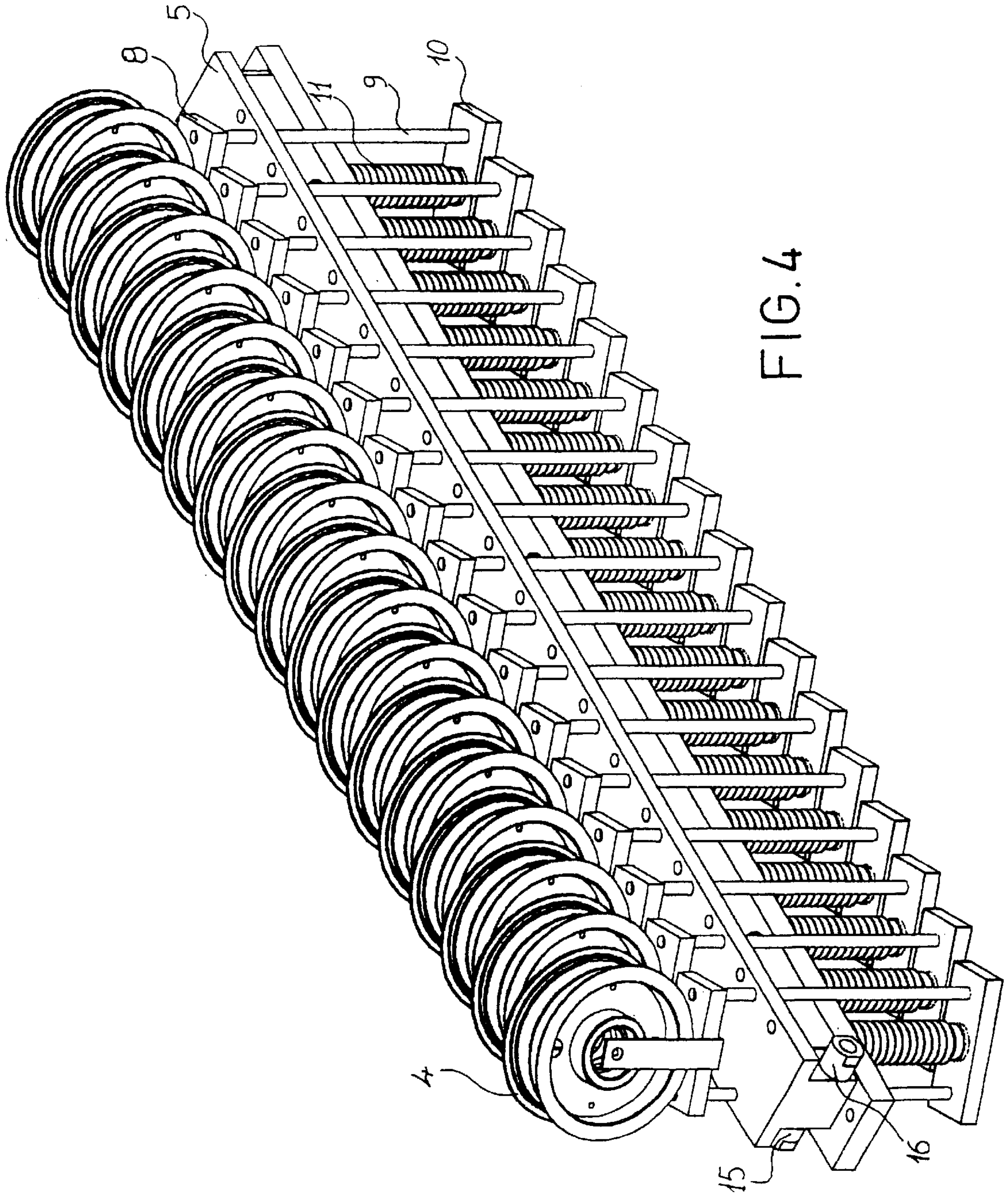
FIG. 4 is a perspective view of the particular of FIG. 2.

Coming now to observe first FIG. 1 of the enclosed drawings, it is shown a frame, generically indicated by the reference number 1, and that will be not described in detail, not being specific object of the present invention. The specific frame shown will not have to be unduly used to limit the scope of the invention.

Said frame 1 provide above a plurality of pulleys, placed side by side each other, for transmission of film 3,and at the bottom a corresponding number of pulleys 4, that in the shown embodiment are provided angled with respect to the pulleys 2.

As already said, the advancement system of the film 3, as well as the structure of the frame 1, are not inventive features.

The solution according to the present invention can be better understood making now specific reference to the following FIGS. 2–5 of the enclosed drawings.

Each frame 1 of apparatus according to the invention provides at the bottom a block 5 supporting the pulleys 4. The number of pulleys 4, corresponding to the number of pulleys 2, is not important, and can be the same or different with respect to the one (seventeen) shown in the figures.

Figure 5:
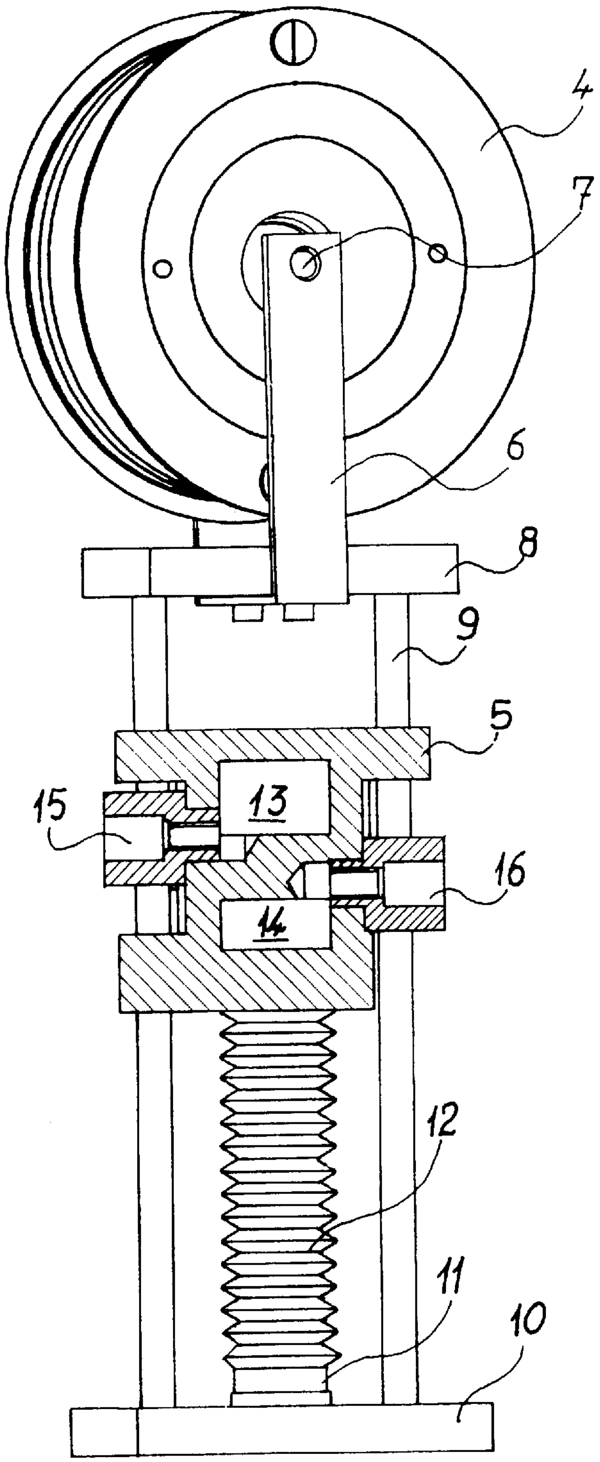
FIG. 5 is a detailed front view of the particular embodying the solution according to the present invention.

Specifically observing FIG. 5, wherein a single pulley is shown, it can be noted how each one of them provides a pair of lateral brackets 6, bearing at the above the pin 7 for the idle rotation of the pulley 4, and at the bottom fixed at a base 8.

Said base 8 is mounted on two rods 9, slidably placed on said block 5, and provided at the bottom with a lower base 10.

Between the lower part of the block 5 and said lower base 5 a piston 11 is mounted, said piston 11 in the embodiment shown is of the pneumatic kind, but that could be a hydraulic piston, a hydropneumatic piston, oleodynamic piston, a oleo-pneumatic piston, etc.

Outward the piston 11 a protection bellow 12 is provided.

Along the block 5 two chambers 13, 14 are obtained, extending for the whole length, respectively the main air chamber 13 and the secondary air chamber 14, provided with valves, respectively indicated by reference numbers 15 and 16.

Compressed air will be fed to the various pistons 11 through the primary chamber 13, by means, not shown, serving all the piston 11 of each frame.

Therefore, simply acting on the pressure of air sent to the pistons, it is possible to vary extension of the same pistons 11 that, acting on the lower base 10, determine the sliding of the rods 9, dragging the base 8 and the pulley 4, thus determining the tensioning of the film 3.

It will be possible to vary in any moment the tension of the film of each single frame, and the same tension can be varied in function of the production rate wished and of the development step.

In this way, beside being possible to reach very higher production rates, it is also possible to avoid to subject the film to undue stresses.

Obviously, the one shown in the figures is an optimum solution, but it would be possible also to think to provide one piston 11 interlocking a certain number of pulleys, all provided on the same base 8.

The solution suggested according to the present invention, beside being more flexible, is also very much simpler with respect to those presently available on the market, being avoided the presence of a very high number of single weights.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. Apparatus for developing films, particularly movie films, comprising a plurality of substantially vertical frames, for supporting and winding the film, placed within the different treatment rooms, each one of said frames providing a plurality of transmission turns for the film, each one of said turns substantially comprising an upper pulley and a lower pulley, and tensioning means of the film acting on the lower pulley, said apparatus being characterised in that said tensioning means of the film in the single turns are comprised of piston means, said piston is a pneumatic, hydraulic, oleodynamic, or oleopneumatic piston, preferably a pneumatic piston, provided under the lower pulley of said turn, a single feeding system being provided for the piston means of each frame.

2. Apparatus for developing films, particularly movie films, according to claim 1, wherein one of said piston means is provided for each turn of the frame.

3. Apparatus for developing films, particularly movie films, according to claim 1, wherein a piston is provided for a group of turns, said group of turns could be comprised of two or more turns.

4. Apparatus for developing films, particularly movie films, according to claim 1, wherein said tensioning means of the film comprise a block, within which a chamber for the primary air and a chamber for the seondary air are realised, a frame, supporting each lower pulley of the turns, vertically slidable with respect to said block, and pneumatic piston means, one piston means for each turn, placed between the lower part of said frame and said block, in such a way to act as traction an the lower pulley of the turn.

5. Apparatus for developing films, particularly movie films, according to claim 4, wherein valves are provided on said air primary and secondary chambers.

6. Apparatus for developing films, particularly movie films, according to claim 1, wherein a protection bellow is provided on said piston means.

7. Apparatus for developing films, particularly movie films, according to claim 1, wherein said lower pulley is oriented with an angle with respect to the upper pulley.

* * * * *